Feb. 8, 1927.

W. K. FLEMING ET AL 1,616,615

STORAGE CELL COVER

Original Filed March 19, 1923

Inventors
Wilfred K. Fleming
Albert M. Baehr
By Bates Macklin Goldrick & Teare
Attorneys Patented Feb. 8, 1927.

1,616,615

UNITED STATES PATENT OFFICE.

WILFRED K. FLEMING AND ALBERT M. BAEHR, OF LAKEWOOD, OHIO, ASSIGNOR, BY MESNE ASSIGNMENTS, TO THE STORAD MANUFACTURING COMPANY, OF CLEVELAND, OHIO, A CORPORATION OF OHIO.

STORAGE-CELL COVER.

Original application filed March 19, 1923, Serial No. 626,194, Patent No. 1,520,495, dated December 23, 1924. Divided and this application filed September 19, 1924. Serial No. 738,586.

This invention relates to covers for storage cells such as are adapted for use in "B battery" for radio-telephonic communication and embodies a division of our copending application, Serial No. 626,194 filed March 19, 1923.

Some storage cells heretofore used comprise a glass receptacle which is open at the upper end and is adapted to receive a closure of hard rubber through which the battery cell posts extend. To prevent leakage between the post and cover, the opening through which the posts extend have been made larger than the post while soft rubber bushings or sleeves have been placed over the posts. Similarly to prevent leakage around the upper end of the jar it has been necessary to use a soft rubber gasket between the jar and the inner wall of the cover.

One of the objects of our invention therefore, is the provision of a cover which prevents leakage of acid from a cell and also functions to maintain the cell plates in adjusted position without the necessity for gaskets and independent bushings.

Figure 1:
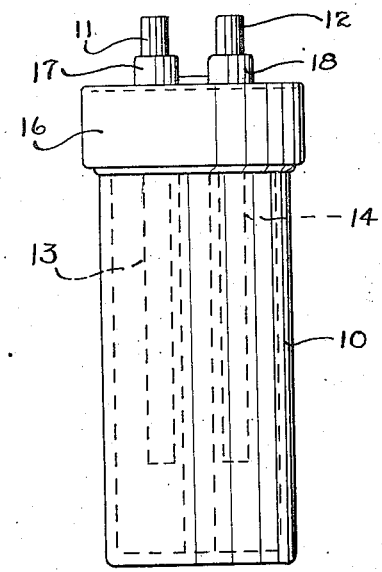
Figure 2:
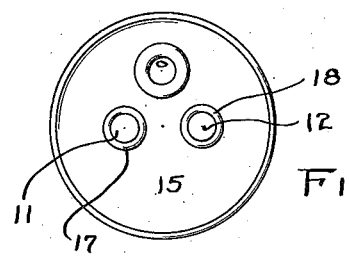
Figure 3:
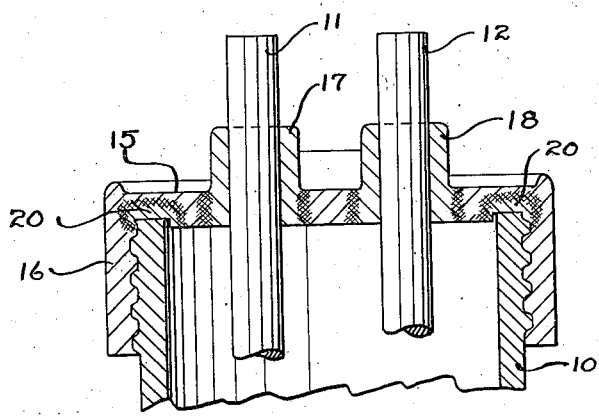

In the drawings, Fig. 1 is a side elevation of a storage cell having a cover constructed in accordance with our invention; Fig. 2 is a plan view of the cell cover; and Fig. 3 is a transverse section on an enlarged scale through the cover and through a portion of the jar.

We have illustrated our invention in connection with a storage cell wherein 10 indicates a glass jar or receptacle, while 11 and 12 indicates posts which may be integral with plates 13 and 14 respectively. The posts project through openings in the cover and beyond the upper surface thereof to provide sufficient area for attachment of a connector terminal.

The cover is shown as having a flat portion 15 which extends across the top of the cell, and as having a skirt portion 16 which may be in engagement with the cell. The flat portion and skirt portion are made of hard rubber wherefore the cover may be brought firmly into engagement with the cover, such as by a threaded connection, to prevent leakage of acid between the cover and jar.

To position the posts within the cover we have shown bushings or sleeves 17 and 18 which closely embrace the post and are integral with the flat portion 15 of the cover. The sleeves are made of pliable rubber so as to grip the posts and to hold the plates suspended within the jar without requiring the use of shoulders on the posts to engage portions of the cover. This permits the plates to be moved vertically with reference to the jar so as to facilitate the making of a connection between one cell and an adjacent cell.

The cover, having a portion thereof comprising hard rubber and another portion comprising soft rubber, can be made by bringing together a mass of hard crude rubber stock and a mass of soft crude rubber stock and then moulding the two together to provide the finished article. Another method for producing the same result is to semicure the soft rubber portions and then to place such portions into a mold with hard rubber stock and to mold the two together. As a result of this construction the inner diameter of each sleeve may be less than the diameter of the associated posts, wherefore the posts will be tightly embraced by the sleeves sufficiently to hold them in the desired vertical position.

Within the under side of the flat portion of the cover we may provide an annular recess which is adapted to be disposed directly over the top of the jar. Within the recess, we provide a section of rubber, which when finished is pliable yet is integral with the flat rigid portion. The purpose of the pliable section 20 is to eliminate the necessity for a gasket between the cover and the top of the jar, and thereby to prevent leakage between the cover and jar.

We have set forth our invention as embodying a cover wherein the major part of the flat portion is hard while pliable inserts are employed for positioning the posts. In our copending application, however, we have set forth the subject matter which is divisible and can be properly submitted in the present application. This matter embodies a cover having a pliable flat portion with rigid flanged portion which is threaded to engage the jar. When this construction is employed, the pliable top functions to maintain the posts in proper position and also to prevent leakage between the cover and jar.

In view of the foregoing description, it will be seen that we have provided a cover which will efficiently seal a cell jar and will hold the cell plates in proper adjusted position without the necessity for independent bushings or gaskets.

We claim:

1. A cover for engaging a cell jar comprising a flat portion adapted to be disposed across the top of the jar and an annular portion for engaging the side of the jar, the flat portion having a ring of soft rubber on the underside thereof and integral therewith for engaging the top of the jar, and having spaced projections comprising soft rubber and integral therewith, said projections being adapted to engage contact plates and to suspend them within said jar.

2. In a device of the character described, the combination with a jar, of a cover therefor, said cover having a flat portion and an integral flanged portion, the flat portion being in engagement with the top of the jar, and comprising semi-rigid material and serving to provide a close-fitting engagement with the top of the jar whereby leakage between the jar and cover is prevented, and the flanged portion being harder than the top portion.

In testimony whereof, we hereunto affix our signatures.

WILFRED K. FLEMING.
ALBERT M. BAEHR.